(12) United States Patent
Dunning et al.

(10) Patent No.: US 10,794,294 B1
(45) Date of Patent: Oct. 6, 2020

(54) EFFICIENT JET

(71) Applicant: ROLLS-ROYCE plc, London (GB)

(72) Inventors: Pascal Dunning, Derby (GB); Craig W Bemment, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/695,472

(22) Filed: Nov. 26, 2019

(30) Foreign Application Priority Data

Sep. 6, 2019 (GB) .................................... 1912822.2

(51) Int. Cl.
*F02C 7/36* (2006.01)
*F02K 3/06* (2006.01)

(52) U.S. Cl.
CPC .................. *F02C 7/36* (2013.01); *F02K 3/06* (2013.01); *F05D 2220/323* (2013.01); *F05D 2220/36* (2013.01); *F05D 2260/40311* (2013.01)

(58) Field of Classification Search
CPC ... F02C 7/36; F02K 3/06; F02K 3/068; F05D 2260/40311; F05D 2220/36
See application file for complete search history.

(56) References Cited

U.S. PATENT DOCUMENTS

| 10,436,035 B1* | 10/2019 | Baralon ..................... F02K 3/06 |
| 2005/0265825 A1* | 12/2005 | Lewis ................... F04D 29/164 415/170.1 |
| 2015/0027101 A1 | 1/2015 | Hasel |
| 2016/0003049 A1 | 1/2016 | Baltas et al. |
| 2016/0003145 A1* | 1/2016 | Qiu .......................... F02K 3/06 60/726 |
| 2018/0230912 A1* | 8/2018 | Hasel ........................ F02K 3/06 |
| 2018/0231018 A1 | 8/2018 | Smith et al. |
| 2018/0252166 A1 | 9/2018 | Pointon et al. |
| 2019/0063368 A1* | 2/2019 | Phelps ...................... F02K 3/06 |

OTHER PUBLICATIONS

Dankanich "Turbofan Engine Bypass Ratio as a Function of Thrust and Fuel Flow" Washington University in St. Louis Washington University Open Scholarship Mechanical Engineering and Materials Science. Independent Study Mechanical Engineering & Materials Science, Apr. 7, 2017, pp. 1-25 (Year: 2017).*

(Continued)

*Primary Examiner* — Ted Kim
(74) *Attorney, Agent, or Firm* — Oliff PLC

(57) ABSTRACT

A gas turbine engine includes: an engine core, compressor system, and core shaft. A compressor exit pressure is defined as an average airflow pressure at the exit of the highest pressure compressor at cruise conditions. The core has an annular splitter and bypass flow. Stagnation streamlines around the engine circumference form a streamsurface. A fan is upstream the core with blades having leading and trailing edges, and a radially inner portion within the streamtube. A fan root entry pressure is an average airflow pressure across the radially inner portion leading edge of each fan blade at cruise conditions. An overall pressure ratio, OPR, is defined as the compressor exit pressure divided by the fan root entry pressure. A bypass jet velocity is defined as the jet velocity of air flow exiting the bypass exhaust nozzle at cruise conditions. A jet velocity to OPR ratio is in a range between 4.7 m/s and 7.7 m/s.

17 Claims, 5 Drawing Sheets

(56) References Cited

OTHER PUBLICATIONS

Cumpsty et al "Jet Propulsion: A Simple Guide to the Aerodynamics and Thermodynamic Design and Performance of Jet Engines", Cambridge University Press, 2015, ISBN 1316432637, 9781316432631, pp. 69-73,79. (Year: 2015).*

Gliebe, P.R. and Janardan, B.A. (2003) NASA/CR-2003-21252. Ultra-high bypass engine aeroacoustic study. Oct. 2003. pp. 1-103 (Year: 2003).*

Wikipedia "Axial compressor" downloaded Feb. 12, 2020 (Year: 2020).*

Walsh et al "Gas Turbine Performance", 1998, 2004, Blackwell Science Ltd., Chapter 5, pp. 108-117,368-378 (Year: 2004).*

Gerald Knip, "Analysis of an Advanced Technology Subsonic Turbofan Incorporating Revolutionary Materials", National Aeronautics and Space Administration, NASA TM-89868, pp. 1-24, May 1987.

Stankowski et al., "Aerodynamic Effects of Propulsion Integration for High Bypass Ratio Engines", Journal of Aircraft, vol. 54 Issue 6, pp. 2270-2284, Dec. 2017.

Mattingly et al., "Aircraft Engine Design", American Institute of Aeronautics and Astronautics, Inc., 2nd Edition, Appendix J, pp. 569-589, Aug. 2002.

Mark H. Waters et al., "Analysis of Turbofan Propulsion System Weight and Dimensions", National Aeronautics and Space Administration, NASA TM X-73199, A-6890, NASA Ames Research Center, NASA, Jan. 1977.

\* cited by examiner

EFFICIENT JET

The present disclosure relates to a gas turbine engine for an aircraft and a method of operating a gas turbine engine on an aircraft.

Gas turbine engines for aircraft propulsion have many design factors that affect the overall efficiency and power output or thrust. A general aim for a gas turbine engine is to provide thrust with low specific fuel consumption (SFC). In order to reduce SFC during cruise conditions both the thermal and propulsive efficiencies of the engine need to be increased.

To enable a higher thrust at a high efficiency, a larger diameter fan may be used. When making a larger engine however, it has been found that simply scaling up components of a known engine type may not provide a corresponding scaling of power/thrust and/or efficiency, for example due to differences in heat transfer throughout the larger engine. Reconsideration of engine parameters and operating conditions may therefore be appropriate in order to provide an engine having low SFC.

According to a first aspect there is provided a gas turbine engine for an aircraft comprising:

an engine core comprising a turbine system comprising one or more turbines, a compressor system comprising one or more compressors, and a core shaft connecting the turbine system to the compressor system, wherein a compressor exit pressure is defined as an average pressure of airflow at the exit of the highest pressure compressor of the compressor system at cruise conditions, the engine core further comprises an annular splitter at which flow is divided between a core flow that flows through the engine core and a bypass flow that flows along a bypass duct, wherein stagnation streamlines around the circumference of the engine, stagnating on a leading edge of the annular splitter, form a streamsurface forming a radially outer boundary of a streamtube that contains all of the core flow;

a fan located upstream of the engine core, the fan comprising a plurality of fan blades extending from a hub, each fan blade having a leading edge and a trailing edge, each fan blade having a radially inner portion lying within the streamtube that contains the core flow, and wherein a fan root entry pressure is defined as an average pressure of airflow across the leading edge of the radially inner portion of each fan blade at cruise conditions; and a nacelle surrounding the engine core, the nacelle defining the bypass duct and a bypass exhaust nozzle, wherein:

an overall pressure ratio is defined as the compressor exit pressure divided by the fan root entry pressure, a bypass nozzle pressure ratio is defined as the nozzle pressure ratio of the bypass exhaust nozzle at cruise conditions, and a combined pressure ratio defined as:

$$\frac{\text{overall pressure ratio}}{\text{bypass nozzle pressure ratio}}$$

is in a range between 20 and 29.

According to a second aspect, there is provided a gas turbine engine for an aircraft comprising:

an engine core comprising a turbine system comprising one or more turbines, a compressor system comprising one or more compressors, and a core shaft connecting the turbine system to the compressor system, wherein a compressor exit pressure is defined as an average pressure of airflow at the exit of the highest pressure compressor of the compressor system at cruise conditions, the engine core having a core radius defined between the centreline of the engine and a forward most tip of the engine core;

a fan located upstream of the engine core, the fan comprising a plurality of fan blades extending from a hub, each fan blade having a leading edge and a trailing edge, wherein a radially inner portion of each fan blade is or comprises the portion of each fan blade at a distance from the centreline of the engine less than the core radius, and wherein a fan root entry pressure is defined as an average pressure of airflow across the leading edge of the radially inner portion of each fan blade at cruise conditions; and a nacelle surrounding the engine core, the nacelle defining the bypass duct and a bypass exhaust nozzle, wherein:

an overall pressure ratio is defined as the compressor exit pressure divided by the fan root entry pressure, a bypass nozzle pressure ratio is defined as the nozzle pressure ratio of the bypass exhaust nozzle at cruise conditions, and a combined pressure ratio defined as:

$$\frac{\text{overall pressure ratio}}{\text{bypass nozzle pressure ratio}}$$

is in a range between 20 and 29.

The gas turbine engine of the first and second aspect provides decreased thrust specific fuel consumption at cruise conditions. In order to decrease cruise SFC (i.e. increase overall engine efficiency for reduced fuel burn) both the thermal and propulsive efficiencies of the engine should be increased. High propulsive efficiency may be achieved by having a low specific thrust which results in a low bypass nozzle pressure ratio, whereas high thermal efficiency may be achieved by having a high overall pressure ratio.

The inventors have found that by configuring a gas turbine engine such that the combined pressure ratio defined above is within the above range a desired decrease in cruise SFC may be provided. Decreasing the combined ratio below this range has been found not to provide significant fuel burn benefit as the thermal efficiency of the core will be low due to low overall pressure ratio and propulsive efficiency will be lower due to high specific thrust. Increasing the combined pressure ratio above the range defined above may result in problems with increased engine operating temperatures exceeding the temperature capability of various components within the engine. Any fuel burn advantages are therefore negated by increased cooling flows and/or increased wear or failure of engine components due to the higher operating temperatures required. Moreover, reducing the bypass nozzle pressure ratio so that the combined pressure ratio is above the range above may require the use of an excessively large fan. This may result in undesirable increased weight and installation constraints negating any fuel burn benefits.

The combined pressure ratio may be in a range between 22 and 27.

The overall pressure ratio may be any one of: a) greater than 42.5; b) in a range between 42.5 and 70; c) in a range between 50 and 70; or d) in a range between 52 and 65.

The combined pressure ratio may be in a range between 22 and 27 and the overall pressure ratio may be in a range between 50 and 60. The combined pressure ratio may be in a range between 22 and 27 and the overall pressure ratio may be in a range between 52 and 60.

The bypass nozzle pressure ratio may be in a range between 2.0 and 2.3, and more specifically may be in a range between 2.02 and 2.25.

A bypass jet velocity may be defined as the jet velocity of air flow exiting the bypass exhaust nozzle at cruise conditions, and a jet velocity ratio may be defined as:

$$\frac{\text{bypass jet velocity}}{\text{overall pressure ratio}}$$

and may be in a range between range between 4.7 m/s and 7.7 m/s, and more specifically may be between 5.0 m/s and 7.0 m/s.

A compressor exit temperature may be defined as an average temperature of airflow at the exit of the highest pressure compressor of the compressor system at cruise conditions, a fan root entry temperature may be defined as an average temperature of airflow across the leading edge of the radially inner portion of each fan blade at cruise conditions, and a core temperature rise may be defined as the compressor exit temperature of the highest pressure compressor of the compressor system in Kelvin divided by the fan root entry temperature in Kelvin.

A temperature-pressure ratio may be defined as:

$$\frac{\text{the core temperature rise}}{\text{the bypass nozzle pressure ratio}}$$

and may be in a range between 1.52 and 1.8, and the overall pressure ratio, at cruise conditions, may be in a range between 42.5 and 70, for example 45 and 70.

According to a third aspect, there is provided a method of operating a gas turbine engine on an aircraft, the gas turbine engine being defined as in the first or second as aspect and any of the statements above. The method comprises: operating the gas turbine engine to provide propulsion under cruise conditions such that the combined pressure ratio is in a range between 20 and 29.

According to a fourth aspect there is provided a gas turbine engine for an aircraft comprising:
an engine core comprising a turbine system comprising one or more turbines, a compressor system comprising one or more compressors, and a core shaft connecting the turbine system to the compressor system, wherein a compressor exit pressure is defined as an average pressure of airflow at the exit of the highest pressure compressor of the compressor system at cruise conditions, the engine core further comprising an annular splitter at which flow is divided between a core flow that flows through the engine core, and a bypass flow that flows along a bypass duct, wherein stagnation streamlines around the circumference of the engine, stagnating on a leading edge of the annular splitter, form a streamsurface forming a radially outer boundary of a streamtube that contains all of the core flow;
a fan located upstream of the engine core, the fan comprising a plurality of fan blades extending from a hub, each fan blade having a leading edge and a trailing edge, each fan blade having a radially inner portion lying within the streamtube that contains the core flow, and wherein a fan root entry pressure is defined as an average pressure of airflow across the leading edge of the radially inner portion of each fan blade at cruise conditions; and
a nacelle surrounding the engine core, the nacelle defining the bypass duct and a bypass exhaust nozzle, wherein:
an overall pressure ratio, OPR, is defined as the compressor exit pressure divided by the fan root entry pressure,
a bypass jet velocity is defined as the jet velocity of air flow exiting the bypass exhaust nozzle at cruise conditions, and
a jet velocity to OPR ratio defined as:

$$\frac{\text{bypass jet velocity}}{\text{overall pressure ratio}}$$

is in a range between 4.7 m/s and 7.7 m/s.

According to a fifth aspect, there is provided a gas turbine engine for an aircraft comprising:
an engine core comprising a turbine system comprising one or more turbines, a compressor system comprising one or more compressors, and a core shaft connecting the turbine system to the compressor system, wherein a compressor exit pressure is defined as an average pressure of airflow at the exit of the highest pressure compressor of the compressor system at cruise conditions, the engine core having a core radius defined between the centreline of the engine and a forwardmost tip of the engine core;
a fan located upstream of the engine core, the fan comprising a plurality of fan blades 64 extending from a hub, each fan blade having a leading edge and a trailing edge, wherein a radially inner portion of each fan blade is or comprises the portion of each fan blade at a distance from the centreline of the engine less than the core radius, and wherein a fan root entry pressure is defined as an average pressure of airflow across the leading edge of the radially inner portion of each fan blade at cruise conditions; and
a nacelle surrounding the engine core, the nacelle defining the bypass duct and a bypass exhaust nozzle, wherein:
an overall pressure ratio, OPR, is defined as the compressor exit pressure divided by the fan root entry pressure,
a bypass jet velocity is defined as the jet velocity of air flow exiting the bypass exhaust nozzle at cruise conditions, and
a jet velocity to OPR ratio defined as:

$$\frac{\text{bypass jet velocity}}{\text{overall pressure ratio}}$$

is in a range between 4.7 m/s and 7.7 m/s.

The gas turbine engine of the fourth and fifth aspects also provides a decreased SFC at cruise conditions. As discussed above, in order to decrease cruise SFC both the thermal and propulsive efficiencies of the engine should be increased. High propulsive efficiency may be achieved by having a low bypass nozzle jet velocity. High thermal efficiency may be achieved by having a high overall pressure ratio.

The inventors have found that by configuring a gas turbine engine such that the jet velocity to OPR ratio is within the above range a desired decrease in cruise SFC may be provided. Increasing the jet velocity to OPR ratio above the range has been found not to provide significant fuel burn benefit as the thermal efficiency of the core will be low due to low overall pressure ratio and propulsive efficiency will be lower due to high specific thrust. Decreasing the jet velocity to OPR ratio below the range defined above may result in problems with increased engine operating temperatures as described above. Moreover, reducing the jet velocity to OPR ratio below the range above may require the use of an excessively large fan, resulting in undesirable increased weight and installation constraints negating any fuel burn benefits. For example, reducing the bypass jet velocity so that the jet velocity to OPR ratio is below the range above may require the use of an excessively large fan. This may result in undesirable increased weight and installation constraints negating any fuel burn benefits.

The jet velocity to OPR ratio may be in a range between 5.0 m/s and 7.0 m/s.

The overall pressure ratio may be any one of: a) greater than 42.5; b) in a range between 42.5 and 70; c) in a range between 50 and 70; or d) in a range between 52 and 65.

The jet velocity to OPR ratio may be in a range between 5.0 m/s and 7.0 m/s and the overall pressure ratio may be in a range between 50 and 70. The jet velocity to OPR ratio may be in a range between 5.0 m/s and 7.0 m/s and the overall pressure ratio may be in a range between 52 and 65.

The bypass jet velocity may be in a range between 300 m/s and 366 m/s, and more specifically may be in a range between 320 m/s and 360 m/s.

A bypass nozzle pressure ratio may be defined as the nozzle pressure ratio of the bypass exhaust nozzle at cruise conditions, and a combined pressure ratio may be defined as:

$$\frac{\text{overall pressure ratio}}{\text{bypass nozzle pressure ratio}}$$

and may be in a range between 20 and 29.

A compressor exit temperature may be defined as an average temperature of airflow at the exit of the highest pressure compressor of the compressor system at cruise conditions, a fan root entry temperature may be defined as an average temperature of airflow across the leading edge of the radially inner portion of each fan blade at cruise conditions, and a core temperature rise may be defined as the compressor exit temperature in Kelvin divided by the fan root entry temperature in Kelvin, wherein
a temperature-pressure ratio may be defined as:

$$\frac{\text{the core temperature rise}}{\text{the bypass nozzle pressure ratio}}$$

and may be in a range between 1.52 and 1.8, and the overall pressure ratio may be in a range between 42.5 and 70 (at cruise).

According to a sixth aspect there is provided a method of operating a gas turbine engine on an aircraft, the gas turbine engine being defined as in the fourth or fifth aspect or any of the statements above, wherein the method comprises: operating the gas turbine engine to provide propulsion under cruise conditions such that the jet velocity ratio is in a range between 4.7 m/s and 7.7 m/s.

According to a seventh aspect there is provided a gas turbine engine for an aircraft comprising: an engine core comprising a turbine system comprising one or more turbines, a compressor system comprising one or more compressors, and a core shaft connecting the turbine system to the compressor system, wherein a compressor exit temperature is defined as an average temperature of airflow at the exit of the highest pressure compressor of the compressor system at cruise conditions and a compressor exit pressure is defined as an average pressure of airflow at the exit of the highest pressure compressor of the compressor system at cruise conditions, the engine core further comprising an annular splitter at which flow is divided between a core flow that flows through the engine core, and a bypass flow that flows along a bypass duct, wherein stagnation streamlines around the circumference of the engine, stagnating on a leading edge of the annular splitter, form a streamsurface forming a radially outer boundary of a streamtube that contains all of the core flow;
  a fan located upstream of the engine core, the fan comprising a plurality of fan blades extending from a hub, each fan blade having a leading edge and a trailing edge, each fan blade having a radially inner portion lying within the streamtube that contains the core flow, and wherein a fan root entry temperature is defined as an average temperature of airflow across the leading edge of the radially inner portion of each fan blade at cruise conditions and wherein a fan root entry pressure is defined as an average pressure of airflow across the leading edge of the radially inner portion of each fan blade at cruise conditions; and
  a nacelle surrounding the engine core, the nacelle defining the bypass duct and a bypass exhaust nozzle, wherein:
  an overall pressure ratio is defined as the compressor exit pressure divided by the fan root entry pressure,
  a bypass nozzle pressure ratio is defined as the nozzle pressure ratio of the bypass exhaust nozzle at cruise conditions,
  a core temperature rise is defined as the compressor exit temperature in Kelvin divided by the fan root entry temperature in Kelvin,
  a temperature-pressure ratio defined as:

$$\frac{\text{the core temperature rise}}{\text{the bypass nozzle pressure ratio}}$$

is in a range between 1.52 and 1.8 (at cruise conditions), and
the overall pressure ratio is in a range between 42.5 and 70 (at cruise conditions).

According to an eighth aspect, there is provided a gas turbine engine for an aircraft comprising:
  an engine core comprising a turbine system comprising one or more turbines, a compressor system comprising one or more compressors, and a core shaft connecting the turbine system to the compressor system, wherein a compressor exit temperature is defined as an average temperature of airflow at the exit of the highest pressure compressor of the compressor system at cruise conditions and a compressor exit pressure is defined as an average pressure of airflow at the exit of the highest pressure compressor of the compressor system at cruise conditions, the engine core having a core radius defined between the centreline of the engine and a forwardmost tip of the engine core;
  a fan located upstream of the engine core, the fan comprising a plurality of fan blades extending from a hub, each fan blade having a leading edge and a trailing edge, wherein a radially inner portion of each fan blade is or comprises the portion of each fan blade at a distance from the centreline of the engine less than the core radius, and wherein a fan root entry temperature is defined as an average temperature of airflow across the leading edge of the radially inner portion of each fan blade at cruise conditions and wherein a fan root entry pressure is defined as an average pressure of airflow across the leading edge of the radially inner portion of each fan blade at cruise conditions; and a nacelle surrounding the engine core, the nacelle defining the bypass duct and a bypass exhaust nozzle, wherein:

an overall pressure ratio is defined as the compressor exit pressure divided by the fan root entry pressure, a bypass nozzle pressure ratio is defined as the nozzle pressure ratio of the bypass exhaust nozzle at cruise conditions, a core temperature rise is defined as the compressor exit temperature in Kelvin divided by the fan root entry temperature in Kelvin, a temperature-pressure ratio defined as:

$$\frac{\text{the core temperature rise}}{\text{the bypass nozzle pressure ratio}}$$

is in a range between 1.52 and 1.8 (at cruise conditions), and the overall pressure ratio is in a range between 42.5 and 70 (at cruise conditions).

The gas turbine engine of the seventh and eighth aspect also provides a decreased SFC at cruise conditions. As discussed above, in order to decrease cruise SFC both the thermal and propulsive efficiencies of the engine should be increased. The gas turbine engine of the third aspect provides a reduced SFC by using a high overall pressure ratio for a given ratio of core temperature rise to bypass nozzle pressure ratio (i.e. the temperature-pressure ratio). By operating with a high overall pressure ratio with a low core temperature rise a high compression efficiency is provided.

The inventors have found that by configuring a gas turbine engine such that the temperature-pressure ratio is within the above range a desired decrease in cruise SFC may be provided. Increasing the temperature-pressure ratio above the range may exceed the temperature capability of materials within the engine. Any further performance increase by increasing the temperature-pressure ratio may therefore be negated by the adverse effect of operating at higher temperatures and/or the potential increased cooling flows and/or increased wear or failure of engine components. Decreasing the ratio of core temperature rise to bypass nozzle pressure ratio outside of the above range may result in a large fan. This may result in weight and installation constrains negating any fuel burn benefits provided.

The overall pressure ratio may be in a range between 50 and 70, and more specifically may be in a range between 52 and 65.

The bypass nozzle pressure ratio may be in a range between 2.0 and 2.3, and more specifically may be in a range between 2.02 and 2.25.

The core temperature rise may be in a range between 3.1 and 4.0, and more specifically may be in a range between 3.10 and 3.50.

A bypass nozzle pressure ratio may be defined as the nozzle pressure ratio of the bypass exhaust nozzle at cruise conditions, and a combined pressure ratio defined as:

$$\frac{\text{overall pressure ratio}}{\text{bypass nozzle pressure ratio}}$$

may be in a range between 20 and 29 (at cruise conditions).

A bypass jet velocity may be defined as the jet velocity of air flow exiting the bypass exhaust nozzle at cruise conditions, and a jet velocity ratio defined as:

$$\frac{\text{bypass jet velocity}}{\text{overall pressure ratio}}$$

may be in a range between range between 4.7 m/s and 7.7 m/s, and more specifically between 5.0 m/s and 7.0 m/s (at cruise conditions).

According to a ninth aspect there is provided a method of operating a gas turbine engine on an aircraft, the gas turbine engine being as defined in the seventh or eighth aspect or any of the statements above, wherein the method comprises: operating the gas turbine engine to provide propulsion under cruise conditions such that the temperature-pressure ratio is in a range between 1.52 and 1.8, and the overall pressure ratio is in a range between 42.5 and 70.

A compression stage number may be defined as the number of compression stages provided by the fan and the compressor system combined. The compression stage number may be 13 or greater. According to any aspect or claim, the compression stage number may be no greater than 16. For example, the compression stage number may be 13, 14, 15 or 16.

According to any aspect, the compressor system may comprise a first compressor and a second compressor, the turbine system may comprise a first turbine and a second turbine, the core shaft may be a first core shaft connecting the first compressor and the first turbine, the engine core may further comprise a second core shaft connecting the second turbine to the second compressor, the second turbine, second compressor, and second core shaft may be arranged to rotate at a higher rotational speed than the first core shaft. The first compressor may comprise 3 compression stages and the second compressor may comprise at least 8 compression stages, for example 8, 9 or 10 compression stages.

According to any aspect, an annular fan face may be defined at a leading edge of the fan, and a quasi-non-dimensional mass flow rate Q may be defined as:

$$Q = W \frac{\sqrt{T_0}}{P_0 \cdot A_{fan}}.$$

where: W is mass flow rate through the fan in Kg/s; $T_0$ is average stagnation temperature of the air at the fan face in Kelvin; $P_0$ is average stagnation pressure of the air at the fan face in Pa; and $A_{fan}$ is the area of the fan face in m$^2$. At cruise conditions, Q may have a value in the range between 0.025 Kgs$^{-1}$N$^{-1}$K$^{1/2}$ and 0.038 Kgs$^{-1}$N$^{-1}$K$^{1/2}$, and more specifically Q may have a value in a range between 0.031 Kgs$^{-1}$N$^{-1}$K$^{1/2}$ and 0.036 Kgs$^{-1}$N$^{-1}$K$^{1/2}$, and yet more specifically Q may have a value in a range between 0.032 Kgs$^{-1}$N$^{-1}$K$^{1/2}$ and 0.035 Kgs$^{-1}$N$^{-1}$K$^{1/2}$, and yet even more specifically Q may have a value less than or equal to 0.035 Kgs$^{-1}$N$^{-1}$K$^{1/2}$ at cruise conditions.

According to any aspect, a fan tip pressure ratio may be defined as the ratio of the mean total pressure of the air flow at the exit of the fan that subsequently flows through the bypass duct to the mean total pressure of the air flow at the inlet of the fan. At cruise conditions: the fan tip pressure ratio may be in a range between 1.2 and 1.45, and more specifically may be in a range between 1.35 and 1.44, for example 1.38 to 1.41, for example on the order of 1.41.

According to any aspect, a fan root pressure ratio may be defined as the ratio of the mean total pressure of the air flow at the exit of the fan that subsequently flows through the engine core to the mean total pressure of the air flow at the inlet of the fan. At cruise conditions: the fan root pressure ratio is in a range between 1.13 and 1.3, and more specifically may be in a range between 1.18 and 1.30, for example 1.20 to 1.25, for example on the order of 1.23 or 1.24.

According to any aspect, a fan pressure ratio may be defined as the ratio of the mean total pressure of the air flow at the exit of the fan to the mean total pressure of the air flow at the inlet of the fan. At cruise conditions: the fan pressure ratio is in a range between 1.2 and 1.45, and more specifically may be in a range between 1.35 and 1.43, and yet more specifically may be 1.39.

In any aspect, a stage pressure rise is generated across each compression stage of the compressor system. The average stage pressure rise of the compressor stages provided in the compressor system may be in the range between 1.3 and 1.4.

According to any aspect, the curvature of the root portion of each fan blade may be less than the curvature across the tip portion of the blade, for example being between 40% and 60% less, and optionally around 50% less. The root portion may be the radially inner portion of the blade as described elsewhere herein, and the tip portion may be the radially outer portion of the blade as described elsewhere herein.

Any of the statements above or elsewhere herein may be combined with any of the first to ninth aspects.

As used herein, a range "from value X to value Y" or "between value X and value Y", or the like, denotes an inclusive range; including the bounding values of X and Y.

All temperatures and pressure referred to are total temperature or total pressure unless otherwise stated. Where an average value (e.g. temperature, pressure or other value) is referred to this is taken to be a mean value. All temperatures are in Kelvin unless otherwise stated.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine according to any aspect may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.7 or 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity Utip. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions according to any aspect may be greater than (or on the order of) any of: 0.25, 0.28, 0.29, 0.30, 0.31, 0.32, 0.33, 0.34, 0.35, 0.36, 0.37, 0.38, 0.39 or 0.4. The fan tip loading at cruise conditions may be in an inclusive range bounded by any two of the values in the previous sentence (i.e. the values may form upper or lower bounds), for example in the range of from 0.25 to 0.4, 0.28 to 0.34, or 0.29 to 0.31.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio (OPR) of a gas turbine engine as described and/or claimed herein may be defined as the ratio of the stagnation pressure upstream of the fan (or fan root) to the stagnation pressure at the exit of the highest pressure compressor (before entry into the combustor). The overall pressure ratio is the stagnation pressure at the exit of highest pressure compressor divided by the stagnation pressure upstream of the fan root. More specifically, the overall pressure ratio is defined herein as the average pressure of airflow exiting an outlet of the highest pressure compressor (the compressor exit pressure) divided by the average pressure of airflow entering the inlet of the fan that subsequently flows through the engine core. By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70. The overall pressure ratio may be in the range of from 52 to 65, for example.

Specific thrust of an engine may be defined as the net thrust of the engine divided by the total mass flow through the engine. At cruise conditions, the specific thrust of an engine described and/or claimed herein (for example in accordance with any claim and/or aspect) may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 50 $Nkg^{-1}s$ to 100 $Nkg^{-1}s$, 60 $Nkg^{-1}s$ to 90 $Nkg^{-1}s$, or 70 $Nkg^{-1}s$ to 90 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein (for example in any aspect and/or claim), cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent). Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
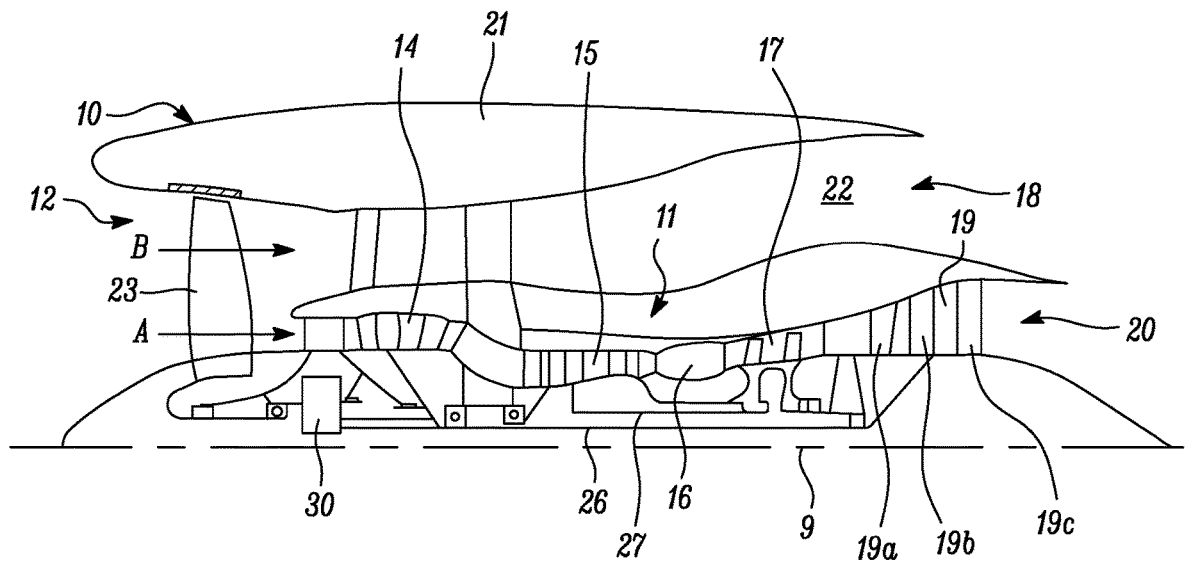
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30. The low pressure compressor 14 and the high pressure compressor 15 together form a compressor system. In other embodiments, the compressor system may have any other number of compressors, for example one or more compressors. Similarly, the high pressure turbine 17 and the low pressure turbine 19 together form a turbine system. In other embodiments, the turbine system may have any other number of turbines, for example one or more turbines.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
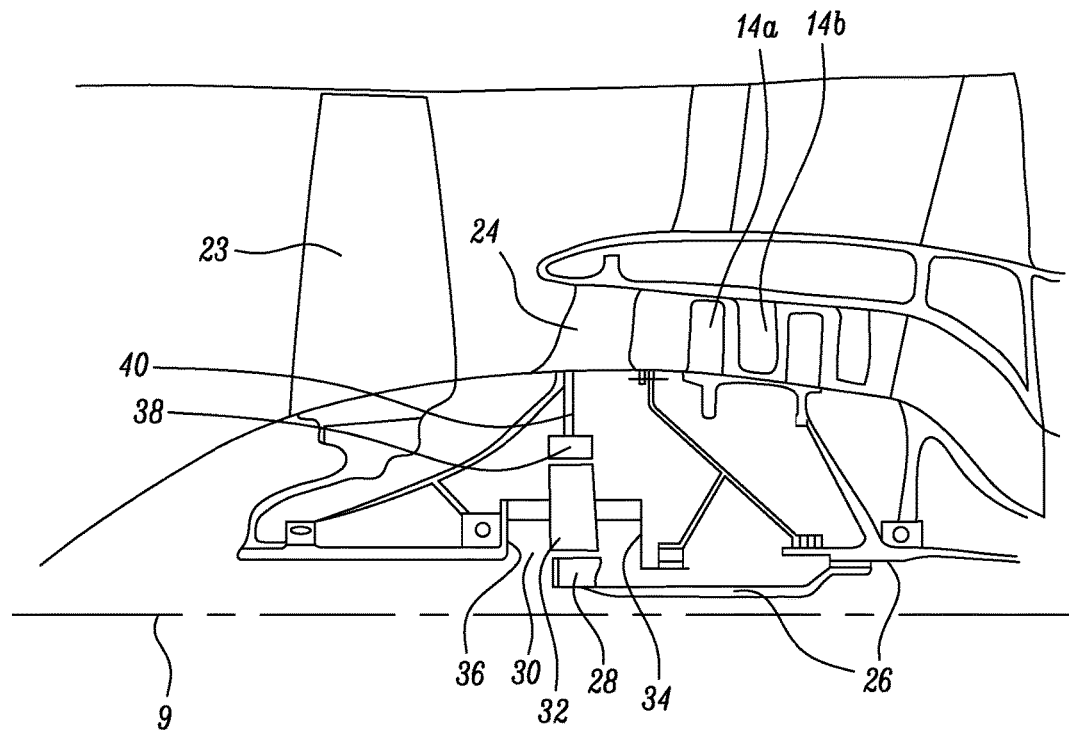
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Each of the compressors provided in the gas turbine engine 10 (e.g. the low pressure compressor 14 and the high pressure compressor 15) comprises any number of compression stages, for example multiple compression stages. Each compression stage may comprise a row of rotor blades 14a and a row of stator vanes 14b that are axially offset from each other. The fan 23 also provides compression of airflow, and so provides an additional compression stage separate from those of the low and high pressure compressors. A compression stage number is defined as the total number of compression stages provided by the fan 23 and the one or more compressors provided in the gas turbine engine. In the presently described embodiment, the compression stage number is therefore the sum of the compression stages provided in the low pressure compressor 14, the high pressure compressor 15 and the fan 23.

In other embodiments, the compression stages provided in the compressors 14, 15 of the gas turbine engine may not be axial compression stages. In some embodiments, one or more radial compression stages may be provided in additional or alternatively to the axial compression stages provided in each compressor. For example, in one embodiment, the low pressure compressor and/or the high pressure compressor may comprise one or more axial compression stages (each formed by a row of rotor blades and stators) followed by a radial compression stage provided downstream of the axial compression stage or stages. In yet other embodiments, each of the compressors may comprise only radial compression stages.

The compression stage number is defined as the total number of compression stages, including both radial and axial compression stages (including the fan). In all of the embodiments described above, each radial compression stage may comprise a centrifugal compressor.

Figure 3:
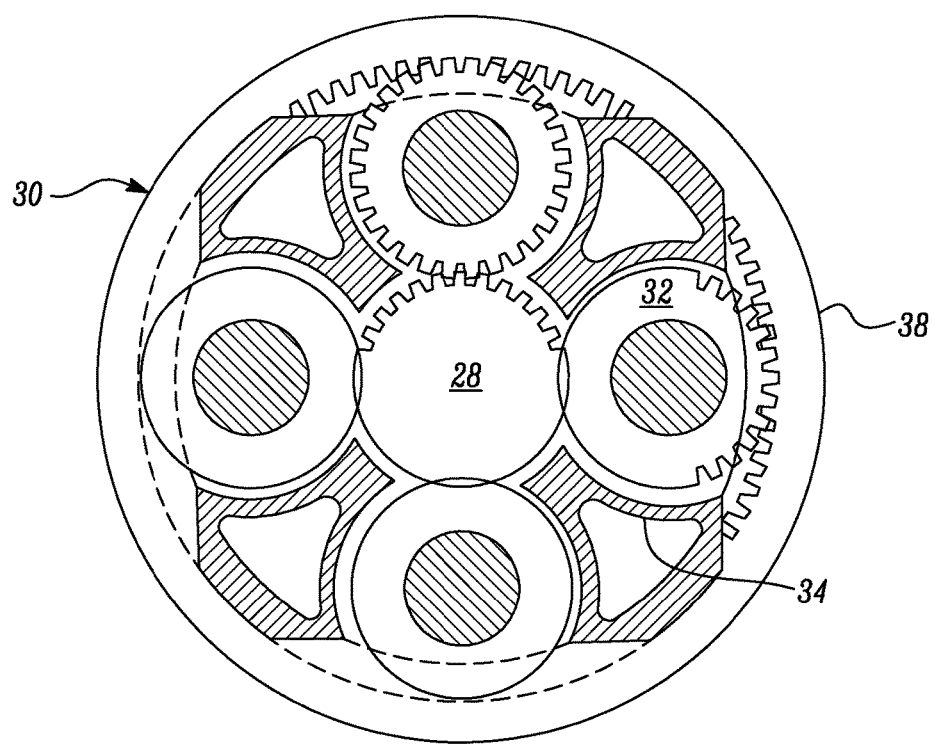
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

In the presently described embodiment, the gearbox has a gear ratio in a range from 3 to 4. More specifically it is in a range from 3.1 to 3.8 or 3.2 to 3.7.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Various parameters of the gas turbine engine are discussed in the following sections, and are summarised in Table 1: The numbering used for the pressures and temperatures corresponds to that provided in SAE standard AS755F. The values given in table 1 and in the two examples that follow it are taken at cruise conditions (as defined elsewhere herein).

| Parameter | Approximate value in various embodiments |
|---|---|
| Pressure P30 of airflow exiting an outlet of the highest pressure compressor 15 | 1450 to 2520 KPa<br>For example 1990 KPa or 1550 KPa |
| Pressure P20 of airflow entering the inlet of the fan 23 that subsequently flows through the engine core 11 | 28.3 to 35.6 KPa<br>For example 38 KPa or 36 KPa |
| Bypass nozzle pressure ratio (at cruise conditions) | 1.8 to 2.4, specifically 2.0 to 2.3 and yet more specifically 2.20 to 2.30. For example 2.2 or 2.1. |

| Parameter | Approximate value in various embodiments |
|---|---|
| Bypass jet velocity (vjet) (at cruise conditions) | 300 m/s to 366 m/s, specifically 320 m/s to 366 m/s (i.e. 1070 ft/s to 1200 ft/s), yet more specifically 320 m/s to 360 m/s, or even more specifically 329 m/s to 360 m/s. For example, 340 m/s or 320 m/s. |
| Fan root entry temperature T20 (at cruise) | 240K to 255K, specifically 248K to 252 K. For example 240K or 250K |
| Compressor exit temperature T30 (at cruise) | 760 to 875K, specifically 825K to 865K. For example 840K or 770K. |

For example, in one embodiment having a fan diameter in the range from 330 to 380 cm, pressure P30 is 1990 KPa and pressure P20 is 38 KPa. In this embodiment, the bypass nozzle pressure ratio is 2.22 (at cruise conditions) and the bypass jet velocity is 340 m/s (at cruise). The fan root entry temperature T20 is 250K and the compressor exit temperature T30 is 840K.

For example, in an alternative embodiment having a fan diameter in the range from 240 cm to 280 cm, pressure P30 is 1550 KPa and pressure P20 is 36 KPa. In this embodiment, the bypass nozzle pressure ratio is 2.1 (at cruise conditions) and the bypass jet velocity is 320 m/s (at cruise). The fan root entry temperature T20 is 240K and the compressor exit temperature T30 is 770K.

The skilled person would appreciate that one or more of the pressures and temperatures listed in Table 1 may be measured or otherwise determined in various ways, for example by use of a pressure or temperature probe or rake, by modelling, or by indirect determination from other parameters measured (or otherwise determined) elsewhere in the engine using analytical methods such as an engine performance model calibrated against engine test data.

The skilled person would appreciate that one or more of the pressures, temperatures or velocities listed in Table 1 may be difficult to measure practically. Various pressures, temperatures or velocities may therefore be inferred from measurements taken elsewhere and knowledge of engine properties and temperature/pressure relationships.

Overall Pressure Ratio

Figure 4A:
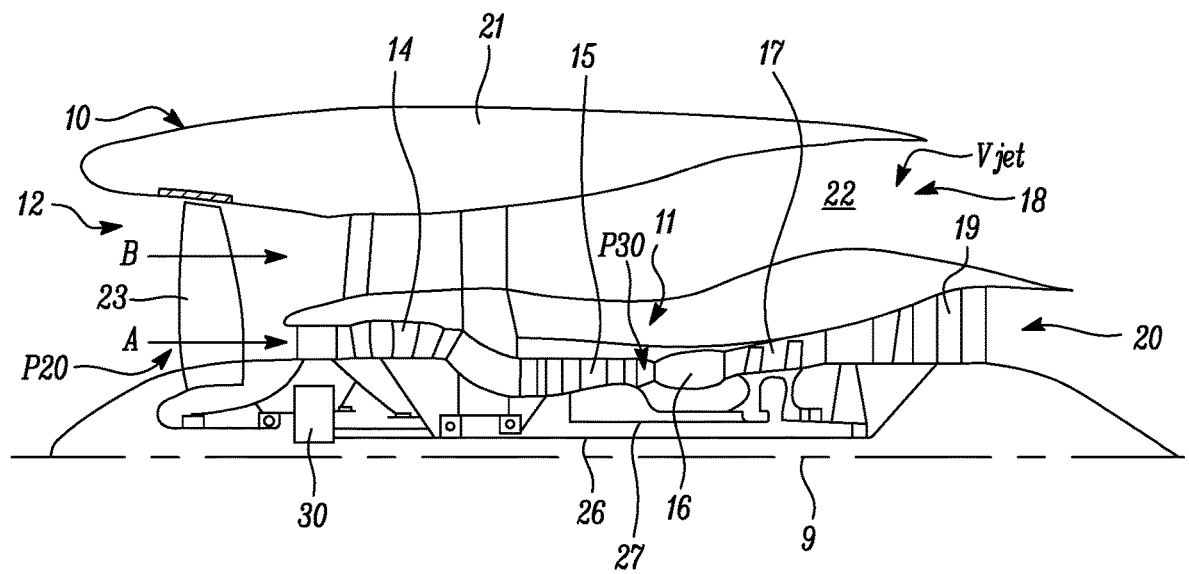
FIG. 4A shows a section side view of a gas turbine engine illustrating various gas flow parameters.

FIG. 4A illustrates various gas flow parameters of the gas turbine engine 10 while operating at cruise. An overall pressure ratio is defined as the average pressure P30 of airflow exiting an outlet of the highest pressure compressor 15 at cruise conditions (the compressor exit pressure) divided by the average pressure P20 of airflow entering the inlet of the fan 23 that subsequently flows through the engine core 11 (e.g. as core airflow A) at cruise conditions. P20 is referred to as the fan root entry pressure. Both P20 and P30 may be as defined in the SAE standard AS755F. Both pressures P20 and P30 are total pressures.

Figure 4B:
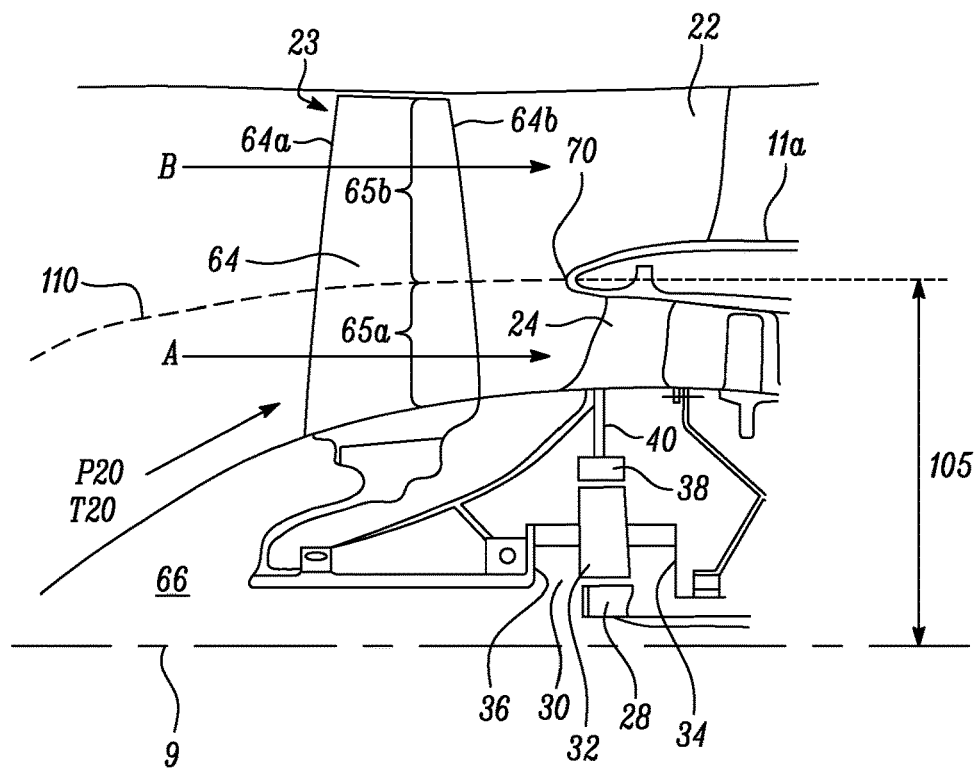
FIG. 4B shows another section side view of a gas turbine engine illustrating various gas flow parameters.

The definition of P20 is illustrated further in FIG. 4B. As noted above, downstream of the fan 23 the air splits into two separate flows: a first air flow A into the engine core 11 and a second air flow B which passes through the bypass duct 22 to provide propulsive thrust. The first and second airflows A, B split at a generally annular splitter 70, for example at the leading edge of the generally annular splitter 70 at a generally circular stagnation line. The splitter 70 is provided by a forwardmost portion of the core casing 11a in the embodiments being described, and may alternatively be referred to as a forwardmost tip 70 of the engine core 11 in some embodiments.

A stagnation streamline 110 stagnates on the leading edge of the splitter 70. The stagnation streamlines 110 around the circumference of the engine 10 form a streamsurface 110. All of the flow A radially inside this streamsurface 110 ultimately flows through the engine core 11. The streamsurface 110 forms a radially outer boundary of a streamtube that contains all of the flow that ultimately flows through the engine core, which may be referred to as the core flow A. All of the flow B radially outside the streamsurface 110 ultimately flows through the bypass duct 22. The streamsurface 110 forms a radially inner boundary of a streamtube that contains all of the flow B that ultimately flows through the bypass duct 22, which may be referred to as the bypass flow B. The streamsurface 110, and correspondingly the streamtube, may be defined at cruise conditions.

As can be seen FIG. 4B, each fan blade 64 of the fan 23 has a leading edge 64a and a trailing edge 64b, and extends radially from the hub 66. Each fan blade 64 has a radially outer portion 65b that is washed by airflow that forms the bypass airflow B and a radially inner portion 65a that is washed by airflow that forms the core airflow A. The boundary between the inner and outer portions of the fan blade is therefore at the streamsurface 110.

The inner and outer portions of the fan blade may instead be defined relative to the position of the splitter 70 (i.e. the forward most point of the engine core). The engine core 11 has a core radius 105 defined between the centreline 9 of the engine 10 and a forward most tip of the engine core 11 i.e. at the splitter 70. The radially outer portion 65b of each fan blade 64 is generally the portion of each fan blade 64 at a radial distance from the centreline 9 of the engine 10 greater than the core radius 105. The radially inner portion 65a is generally the portion of each fan blade 64 at a radial distance from the centreline 9 of the engine 10 less than the core radius 105

The skilled person would appreciate that, in reality the streamsurface 110 may slope and/or curve relative to the engine axis 9, such that some of the gas stream passing the fan blade 64 at a radial distance from the centreline 9 of the engine 10 slightly less than or equal to the core radius 105 may still enter the bypass stream B in some embodiments. In the embodiments being described, the slope and/or curvature of the streamsurface 110 relative to the engine axis 9 is relatively small, such that using the radial position of the splitter 70 provides an at least substantially equivalent pressure (or temperature as described later) to using the streamsurface 110, within measurement errors. The division at a set radial position may therefore provide an equivalent value which may be easier to determine than streamtube shape in some scenarios.

The pressure P20 may be defined as the average pressure of airflow at the leading edge 64a of the inner portion 65a of the fan blade at cruise conditions. As discussed above, this is the pressure of airflow that subsequently passes through the engine core.

The compressor exit pressure P30 is defined as an average pressure of airflow at the exit from the compressor 15 at cruise conditions. P30 is defined at the axial position of the trailing edge of the rearmost rotor of the compressor 15.

In the described embodiment, the overall pressure ratio of the gas turbine engine (at cruise conditions) is greater than 42.5. Yet more specifically, the overall pressure ratio is in a range between 42.5 and 70, between 50 and 70 or between 52 and 65.

Bypass Nozzle Pressure Ratio

Referring again to FIG. 4A, airflow exiting the bypass exhaust nozzle 18 has a bypass nozzle pressure ratio, PN. The bypass nozzle pressure ratio is defined as the ratio between the total pressure at the bypass exhaust nozzle entry after any bypass duct pressure loss and ambient pressure. The bypass nozzle pressure ratio is defined herein at cruise conditions.

In the described embodiment, the bypass nozzle pressure ratio is in a range between 2.0 and 2.3. More specifically the bypass nozzle pressure ratio is in a range between 2.02 and 2.25.

The gas turbine engine 10 is configured such that, at cruise conditions, a combined pressure ratio defined as:

$$\frac{\text{the overall pressure ratio}}{\text{the bypass nozzle pressure ratio}}$$

is in a range between 20 and 29, and yet more specifically is in a range between 22 and 27. The cruise conditions are as defined elsewhere herein (e.g. 35 kft, and respective cruise Mach associated with design flight Mach number, or otherwise as defined elsewhere herein).

In one embodiment, the combined pressure ratio is in a range between 22 and 27 with the overall pressure ratio being in a range between 50 and 60. More specifically, the combined pressure ratio is in a range between 22 and 27 with the overall pressure ratio being in a range between 52 and 60.

In other disclosed examples, the combined pressure ratio may be any of the following: 20, 21, 22, 23, 24, 25, 26, 27, 28 or 29. The combined pressure ratio may be in an inclusive range bounded by any two of the values in the previous sentence (i.e. the values may form upper or lower bounds).

By configuring the gas turbine engine to operate in this way reduced cruise SFC may be provided. Other advantages such as reduced noise and reduced fuel burn may also be provided.

EXAMPLE IMPLEMENTATIONS

In the embodiment being described a low fan pressure rise and consequently low bypass nozzle pressure ratio is facilitated by use of a geared architecture. Specifically, the use of a gearbox allows the fan to rotate at relatively lower speeds to achieve a low fan pressure rise, and allow the gas turbine engine to operate with the parameter range defined above (and any other parameter ranged defined or claimed herein). In one example embodiment, a low fan speed includes fan tip speeds below Mach 1.1, and/or maximum rotation at less than 2000 rpm. The arrangements described in this example implementations section are to be understood as only examples of how the engine may be configured to operate with ratios of parameters falling within the ranges defined herein. The factors described in this section may apply to other ratios described herein (in addition to the combined pressure ratio), such as the jet velocity ratio and/or the temperature pressure-ratio.

In order to achieve the required low fan speed a suitably aerodynamic fan design is chosen. An efficient aerodynamic fan design may comprise, for example, one or more of (i) a relatively wide chord with a relatively long sweep, (ii) relatively low suction surface curvature, and (iii) a relatively low friction surface. The fan root may be designed to have a low temperature rise and a low level of work to facilitate the operability of the fan and the obtaining of a high level of propulsive efficiency. The high level of propulsive efficiency may be provided by a relatively straight fan root, having a low level of curvature compared to the fan tip. The fan root is defined as the inner portion 65a of the fan blade that does work on air that subsequently passes through the engine core as already defined elsewhere. The fan tip therefore corresponds to the radially outer portion 65b of the fan blade.

For example, the curvature of the fan root may be less than 60% of the curvature of the fan tip. In the embodiment being described, the curvature of the root portion of the blade is between 40% and 60% less than the curvature across the tip portion of the blade, and optionally around 50% less. In alternative or additional embodiments, the curvature of the root portion may be less than that of the tip portion by an amount within a range having a lower bound of any of 5%, 10%, 20%, 30%, 40% and an upper bound of any of 40%, 50% or 60%. The listed percentages are percentages of the blade camber (i.e. difference between a line that is tangent to the camber line at the leading edge of the blade 64a and a line that is tangent to the camber line at the trailing edge of the blade 64b).

The skilled person would appreciate that the "root portion" of a fan blade is sometimes taken to mean the portion of a fan blade 64 within the hub 66 and used to connect the blade 64 to the hub 66; this is not the case as used herein—the root portion refers to the radially inner portion of the blade as described elsewhere herein, extending from the hub 66 and across the entrance to the core 11. The radially inner portion of the blade as defined herein may also be known as the "hub section" of the blade by the skilled person.

In addition, or alternatively, a compressor design may be selected to provide a compressor 14, 15 with an aerodynamic design that is efficient at a high level of loading. In the described embodiment 13 or more compression stages are provided (including the fan 23 as the first stage) so as to provide the desired effects. Where the compressor system comprises a low pressure compressor and a high pressure compressor, the high pressure compressor may have at least 9 compression stages and the low pressure compressor may have 3 compression stages. The compressor design may comprise a maximum of 16 stages of compression (including the fan 23). In the embodiment being described, the fan 23 provides the first stage, the low pressure compressor 14 provides the subsequent three stages, and the high pressure compressor 15 provides the final nine stages. This embodiment is however only one example of a compressor system which may provide a level of load such that the desired operating parameters are provided. In alternative embodiments, the total number of compression stages may vary, the number of compressors 14, 15 may vary, and/or the split between the one or more compressor(s) may vary while still providing a compression system having a suitable level of loading.

Each compression stage provided in the compressors 14, 15 of the gas turbine engine contributes to the overall pressure increase of the core airflow. A stage pressure rise is generated across each compression stage. The average stage pressure rise (i.e. the stage pressure rise averaged over all of the compressor stages provided in the compressor system, excluding the fan) is in the range between 1.3 and 1.4. The pressure rise in this paragraph is taken at cruise conditions.
Bypass Jet Velocity Referring again to FIG. 4A, a bypass jet velocity, vjet, is defined as the jet velocity of airflow exiting the bypass exhaust nozzle 18. The bypass jet velocity may be defined as the fully expanded jet velocity of the bypass exhaust nozzle 18 i.e. the axial jet velocity at the point where the exhaust jet has expanded to ambient pressure. The bypass jet velocity is defined herein at cruise conditions.

In the described embodiment, the bypass jet velocity is in a range between 300 m/s and 366 m/s (i.e. 984 ft/s to 1200 ft/s), and more specifically is in a range between 320 m/s and 360 m/s (i.e. 1050 ft/s to 1180 ft/s).

Figure 5:
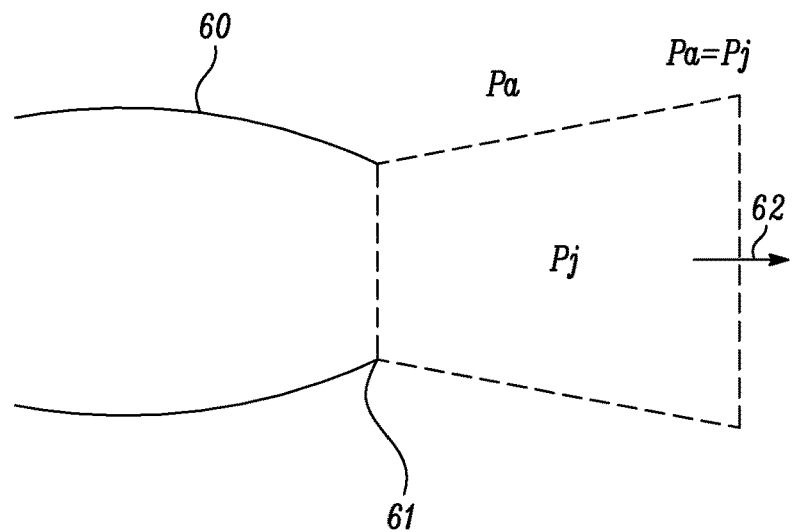
FIG. 5 shows an illustration of the meaning of a fully expanded jet velocity.

FIG. 5 illustrates the concept of a fully expanded jet velocity. FIG. 5 shows an example exhaust nozzle 60 of a gas turbine engine. The pressure Pj at the exit or throat 61 of the exhaust nozzle 60 is greater than the ambient pressure Pa around the engine. At some distance away from the nozzle exit 61 the jet pressure will equalise with the ambient pressure, i.e. Pj=Pa. The fully expanded jet velocity is defined as the jet velocity 62 at this point, i.e. the jet velocity along the axis of the engine at a minimum distance from the exhaust nozzle where the pressure is equal to ambient pressure.

A jet velocity to OPR ratio is defined as:

$$\frac{\text{bypass jet velocity}}{\text{overall pressure ratio}}$$

In the described embodiment, the gas turbine engine 10 is configured such that, at cruise conditions, the jet velocity to OPR ratio is in a range between 4.7 m/s and 7.7 m/s, and more specifically between 5.0 m/s and 7.0 m/s (i.e. 15.4 ft/s and 25.3 ft/s, and more specifically is in a range between 16.4 ft/s and 23.0 ft/s). The cruise conditions are as defined elsewhere herein (e.g. 35 kft, and respective cruise Mach associated with design flight Mach number, or as otherwise defined elsewhere herein).

In one embodiment, the gas turbine engine 10 is configured such that, at cruise conditions, the jet velocity to OPR ratio is in a range between 5.0 m/s and 7.0 m/s with an overall pressure ratio between 50 and 70, and more specifically with an overall pressure ratio between 52 and 65.

In other disclosed examples, the jet velocity to OPR ratio may be any of the following: 4.7, 5.0, 5.5, 6.0, 6.5, 7.0, 7.5 or 7.7 (all values in this sentence are in m/s). The jet velocity ratio may be in an inclusive range bounded by any two of the values in the previous sentence (i.e. the values may form upper or lower bounds).

By configuring the gas turbine engine to operate with a jet velocity ratio in this range a reduced cruise SFC is provided. Other advantages such as reduced noise and reduced fuel burn may also be provided.

Figure 6:
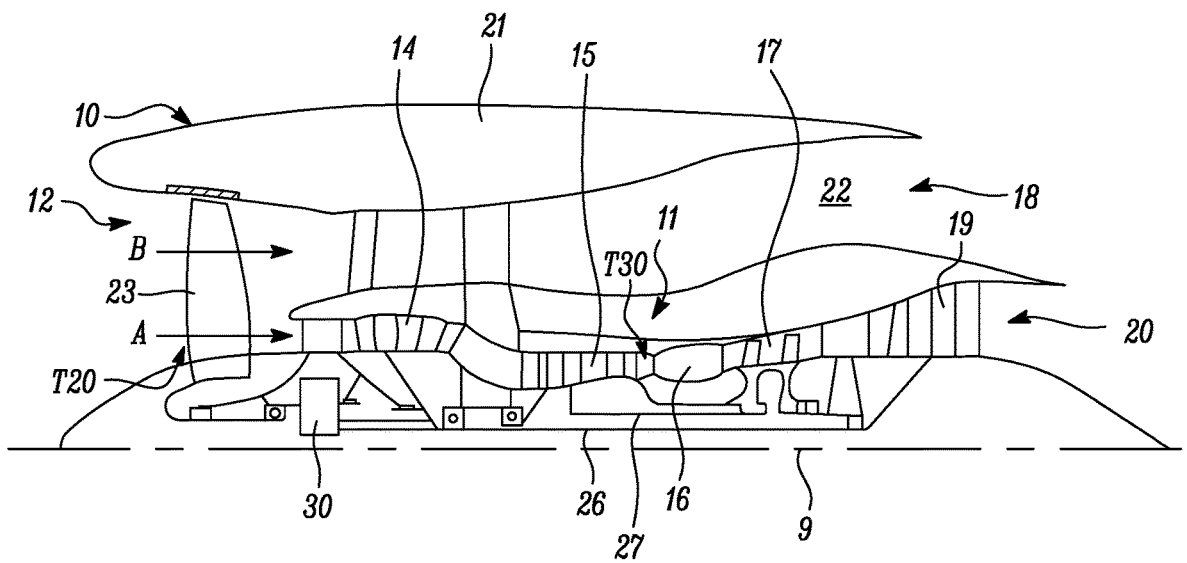
FIG. 6 shows another section side view of a gas turbine engine illustrating various gas flow parameters.

In the embodiment being described a suitably low bypass nozzle jet velocity is enabled by the use of a gearbox and the associated low fan rotational speed (similar to the provision of a low bypass nozzle pressure ratio described above), and a relatively large cold nozzle to allow the flow to travel through it at a lower entry pressure. A core compression system with suitable levels of efficiency and loading is also chosen as described elsewhere herein. As described above, this is achieved in the present embodiment with the use of 13 compression stages provided by the fan and engine core. In order to achieve the required low fan speed a suitably aerodynamic fan design is chosen as already described. This is however only one example of how a jet velocity ratio within the range(s) defined above may be achieved (see example implementations section above).
Core Temperature Rise FIG. 6 illustrates further gas flow parameters of the gas turbine engine 10. As already described, airflow passes through the fan before being split into the core airflow A and bypass airflow B. Work is done by the fan on the air entering the fan inlet which subsequently flows through the engine core as the core airflow A. Within the core the airflow is accelerated and compressed by the low and high pressure compressors 14, 15. The rise in temperature that takes place across the compression part of the engine core, including the fan, is defined as the core temperature rise. Referring to FIG. 6, a fan root entry temperature T20 is defined as an average temperature of airflow across a leading edge of each fan blade that subsequently flows through the engine core at cruise conditions.

The fan root entry temperature T20 is defined in a similar way to the fan root entry pressure P20. Referring again to FIG. 4B, a fan root entry temperature T20 is defined as an average temperature of airflow across the leading edge 64a of the radially inner portion of each fan blade 64. The radially inner portion of each fan blade may be defined as the portion lying within the streamtube that contains the core flow A. Alternatively, the radially inner portion 65a of each fan blade 64 may be defined as being or comprising the portion of each fan blade 64 at a distance from the centreline 9 of the engine 10 less than the core radius 105.

A compressor exit temperature T30 is defined as an average temperature of airflow at the exit of the high pressure compressor 15 (or the highest pressure compressor regardless of the number of compressors provide i.e. the last compressor in axial flow order before the combustion equipment) at cruise conditions. Both T20 and T30 are total temperatures of the airflow. Both T20 and T30 may be as defined as in the SAE standard AS755F.

The core temperature rise is defined as:

$$\frac{\text{the compressor exit temperature } (T30) \text{ in Kelvin}}{\text{fan root inlet temperature } (T20) \text{ in Kelvin}}$$

In the described embodiment, the core temperature rise is in a range between 3.1 and 4.0, specifically between 3.10 and 3.50. For example 3.33 or 3.1.

A temperature-pressure ratio is defined as:

$$\frac{\text{the core temperature rise}}{\text{the bypass nozzle pressure ratio}}$$

In the described embodiment, the gas turbine engine is configured such that, at cruise conditions, the temperature-pressure ratio is in a range between 1.52 and 1.8, and the overall pressure ratio (at cruise conditions) defined above is in a range between 42.5 and 70. More specifically the overall pressure ratio is in the range between 50 and 70; and yet even more specifically between 52 and 65. The cruise conditions are as defined elsewhere herein (e.g. 35 kft, and respective cruise Mach associated with design flight Mach number, or otherwise as defined elsewhere herein).

In other disclosed examples, the temperature-pressure ratio may be any of the following: 1.52, 1.55, 1.60, 1.65, 1.70, 1.75 or 1.80. The temperature-pressure ratio may be in an inclusive range bounded by any two of the values in the previous sentence (i.e. the values may form upper or lower bounds). In this (and any other embodiment) the overall pressure ratio (at cruise) may be any of the following: 42.5, 44, 46, 48, 50, 52, 54, 56, 58, 60, 62, 64, 66, 68, or 70. The overall pressure ratio may be in an inclusive range bounded by any two of the values in the previous sentence (i.e. the values may form upper or lower bounds).

By configuring the gas turbine engine to operate with a temperature-pressure ratio and overall pressure ratio in these ranges a reduced cruise SFC is provided. Other advantages such as reduced noise and reduced fuel burn may also be provided.

As discussed above, a low bypass nozzle pressure ratio may be facilitated by the use of a geared architecture. A core compression system with suitable levels of efficiency and loading is also chosen so that the operating parameters fall within the above ranges. As already described, this is achieved in the present embodiment with the use of 13 compression stages provided by the fan and engine core. In order to achieve the required low fan speed a suitably aerodynamic fan design is chosen. This may be achieved as already described herein. For example, a straight Fan root to enable an operable fan at low bypass nozzle pressure ratio may be used as described elsewhere herein. This typically results in it being at more optimal loading, thus improving efficiency and reducing temperature rise across it for a set level of compression. This is however only one example of how a temperature-pressure ratio within the range(s) defined above may be achieved (see example implementations section above).

Figure 7:
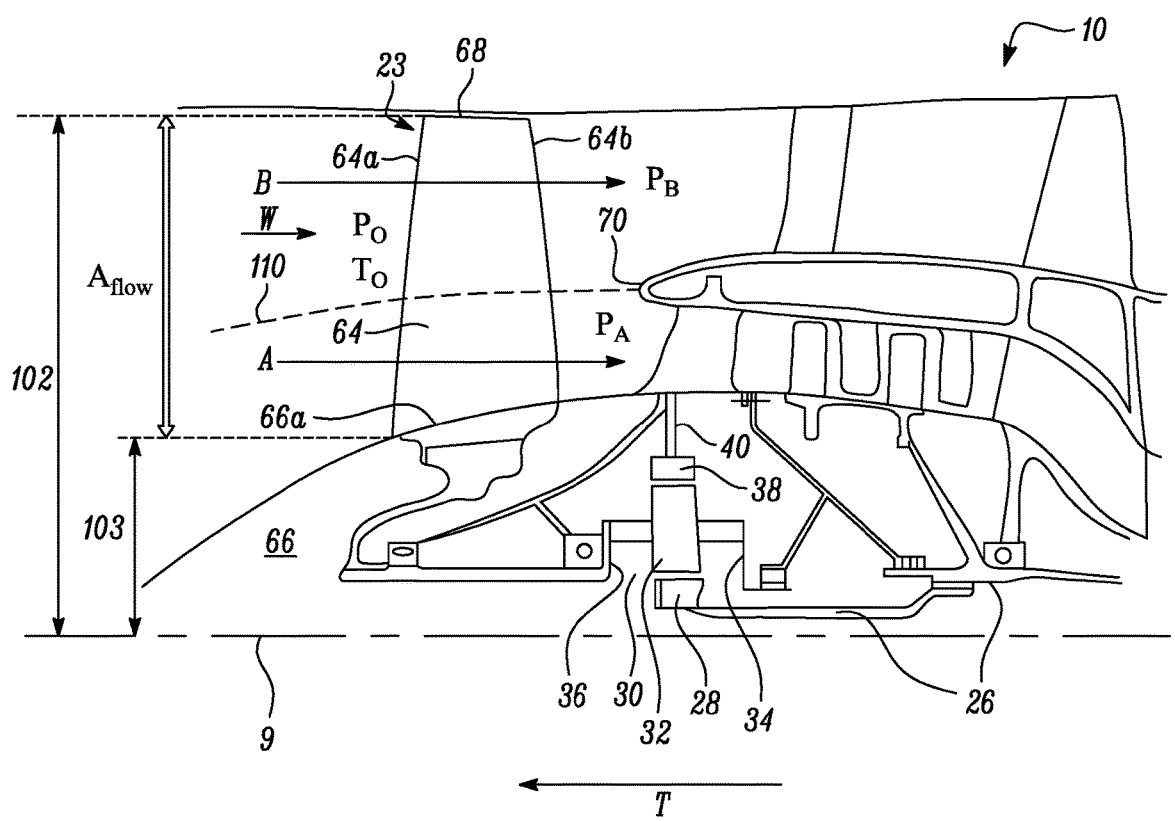
FIG. 7 shows a close up section side view of an upstream portion of a gas turbine engine illustrating various gas flow and physical parameters.

Fan Tip Radius:

Referring to FIG. 7, the fan 23 comprises an annular array of fan blades 64 extending from a hub 66. Each fan blade 64 may be defined as having a radial span extending from a root 66a received in a slot in the fan hub 66 at a radially inner gas-washed location, or 0% span position, to a tip 68 at a 100% span position. As discussed elsewhere herein, each fan blade 64 has a leading edge 64a and a trailing edge 64b defined along the direction of gas flow through the engine. The radius at the fan hub 66a and the radius at the tip 68 may both be measured at the leading edge 64a (or axially forward-most) part of the blade. The hub-to-tip ratio refers to distance 103 shown in FIG. 7 (the gas-washed portion of the fan blade leading edge, i.e. the portion radially outside any platform by which each fan blade is coupled to the hub) divided by the overall fan tip radius 102.

The radius 102 of the fan 23, also referred to as the fan tip radius 102, or $R_{fan\ tip}$, may be measured between the engine centreline 9 and the tip of a fan blade 64 at its leading edge 64a (in a radial direction). The fan diameter (D) may simply be defined as twice the radius 102 of the fan 23.

In the embodiments being described, the fan tip radius 102 is in the range from 95 cm to 200 cm, or from 110 cm to 200 cm. In some embodiments, the fan tip radius is in the range from 95 cm to 150 cm or from 110 cm to 150 cm. In some alternative embodiments, the fan tip radius is in the range from 155 cm to 200 cm In some embodiments, the fan diameter is in the range from 190 cm to 300 cm, or 220 cm to 300 cm. In some alternative embodiments, the fan diameter is in the range from 310 cm to 400 cm.

Hub Radius:

The hub radius, $R_{hub}$, is the (radial) distance 103 (in metres) between the centreline of the engine and the radially inner point on the leading edge of the fan blade (i.e. of radially inner point of the gas-washed surface of the fan blade)—this is equivalent to the radius of the hub 66 of the fan 23 at the point at which the leading edge of each blade 64 extends therefrom.

Fan Area:

The fan face area, $A_{fan}$, is defined as the annular area between fan blade tips 68 and the hub 66 at the axial position of the fan blade leading edge tip. The fan face area is measured in a radial plane. The skilled person will appreciate that $A_{fan}$ is at least substantially equivalent to the area of the annulus formed between the hub 66 of the fan 23 and the inner surface of the nacelle 21 immediately adjacent the leading edge blade tips for the fan engine 10 being described, and is therefore equivalent to the fan face area minus the area taken by the hub 66.

As referred to herein, the flow area of the fan ($A_{fan}$) is defined as:

$$A_{fan} = \pi(R_{fan\ tip}^2 - R_{hub}^2)$$

Where:

$R_{fan\ tip}$ is the radius 102 (in metres) of the fan 23 at the leading edge (i.e. at the tips of the leading edge of the fan blades 64);

$R_{hub}$ is the distance 103 (in metres) between the centreline of the engine and the radially inner point on the leading edge of the fan blade (i.e. of radially inner point of the gas-washed surface of the fan blade)—this is equivalent to the radius of the hub 66 of the fan 23 at the point at which the leading edge of each blade 64 is connected thereto, and may be referred to as the hub radius.

In one embodiment, the ratio of the radius of fan blade 64 at its hub 66 to the radius of the fan blade at its tip 68 may be less than 0.29.

In the embodiment being described, the flow area is defined in a radial plane, and can therefore be calculated using the fan tip radius 102 and the hub radius 103.

Quasi-Non Dimensional Mass Flow Rate Q

Referring to FIG. 7, a quasi-non-dimensional mass flow rate Q may be defined as:

$$Q = W \frac{\sqrt{T_0}}{P_0 \cdot A_{fan}}.$$

where:

W is mass flow rate through the fan in Kg/s;

$T_0$ is average stagnation temperature of the air at the fan face in Kelvin;

$P_0$ is average stagnation pressure of the air at the fan face in Pa;

$A_{fan}$ is the area of the fan face in m².

As referred to herein, the area of the fan face ($A_{fan}$) is defined as:

$$A_{fan} = \frac{\pi D^2}{4}\left(1 - \left(\frac{h}{t}\right)^2\right)$$

Where:

D is the diameter (in metres) of the fan at the leading edge (i.e. at the tips of the leading edge of the fan blades);

h is the distance (in metres) between the centreline of the engine and the radially inner point on the leading edge of the fan blade (i.e. of radially inner point of the gas-washed surface of the fan blade); and t is the distance (in metres) between the centreline of the engine and the radially outer point on the leading edge of the fan blade (i.e. t=D/2)

$A_{fan}$ may also be referred to as a fan flow area as it corresponds to the gas-washed area of the fan (the blade-swept area outside of the hub). This may be equivalently represented as:

$$A_{fan}=\pi(R_{fan\ tip}^2-R_{hub}^2)$$

as described above.

At cruise conditions, Q may have a value in the range between 0.025 and 0.038. More specifically, Q may have a value in the range between 0.031 and 0.036 and yet more specifically in the range between 0.032 and 0.035. In other embodiments, Q may have a value of less than 0.35. All of the values for Q in this paragraph have units $Kgs^{-1}N^{-1}K^{1/2}$. Cruise conditions at which Q is measured are as defined elsewhere herein.

Fan Pressure Ratios

As noted above, downstream of the fan 23 the air splits into two separate flows: a first air flow A into the engine core and a second air flow B which passes through the bypass duct 22 to provide propulsive thrust. Referring to FIG. 7, the first and second airflows A, B split at a generally annular splitter 70, for example at the leading edge of the generally annular splitter 70 at a generally circular stagnation line.

As already described, a stagnation streamline 110 stagnates on the leading edge of the splitter 70. The stagnation streamlines 110 around the circumference of the engine 10 faun a streamsurface 110. All of the flow A radially inside this streamsurface 110 ultimately flows through the engine core. The streamsurface 110 forms a radially outer boundary of a streamtube that contains all of the flow that ultimately flows through the engine core, which may be referred to as the core flow A. All of the flow B radially outside the streamsurface 110 ultimately flows through the bypass duct 22. The streamsurface 110 forms a radially inner boundary of a streamtube that contains all of the flow B that ultimately flows through the bypass duct 22, which may be referred to as the bypass flow B.

In use, the fan blades of the fan 23 do work on the flow, thereby raising the total pressure of the flow. A fan root pressure ratio is defined as the mean total pressure of the flow at the fan exit that subsequently flows (as flow A) through the engine core to the mean total pressure at the inlet to the fan 23. With reference to FIG. 7, the mean total pressure of the flow at the fan exit that subsequently flows through the engine core is the mean total pressure $P_A$ of the flow that is just downstream of the fan 23 and radially inside the streamsurface 110. Also in FIG. 7, the mean total pressure $P_0$ at the inlet to the fan 23 is the mean total pressure over the surface that extends across the engine (for example from the hub 66 to the tip 68 of the fan blade 64) and is immediately upstream of the fan 23.

In the presently described embodiment, the fan root pressure ratio is in a range between 1.13 and 1.3. More specifically the fan root pressure ratio is in a range between 1.18 and 1.30, and yet more specifically it is 1.24. All of the values in this paragraph are at cruise conditions as defined elsewhere herein.

A fan tip pressure ratio is defined as the mean total pressure $P_B$ of the flow at the fan rotor exit that subsequently flows (as flow B) through the bypass duct 22 to the mean total pressure at the inlet to the fan 23. With reference to FIG. 7, the mean total pressure of the flow at the fan exit that subsequently flows through the bypass duct 22 is the mean total pressure over the surface that is just downstream of the fan 23 and radially outside the streamsurface 110.

In the presently described embodiment, the fan tip pressure ratio is in a range between 1.2 and 1.45. More specifically, it is in a range between 1.35 and 1.44, and yet even more specifically it is 1.41. All of the values in this paragraph are at cruise conditions as defined elsewhere herein.

A fan pressure ratio is defined as the ratio of the mean total pressure of the air flow at the exit of the fan to the mean total pressure of the air flow at the inlet of the fan. In the presently described embodiment, the fan pressure ratio, at cruise conditions, is in the range between 1.2 and 1.45. More specifically it is in the range between 1.35 and 1.43, and yet more specifically it is 1.39. All of the values in this paragraph are at cruise conditions as defined elsewhere herein.

As discussed elsewhere herein, the work done by the fan blades 64 on the flow results in an enthalpy rise dH of the flow. In the present embodiment, the fan tip loading (dH/$Utip^2$) at cruise conditions is in a range from 0.25 to 0.4, and more specifically is from 0.28 to 0.34, and yet even more specifically from 0.29 to 0.31.

Figure 8:
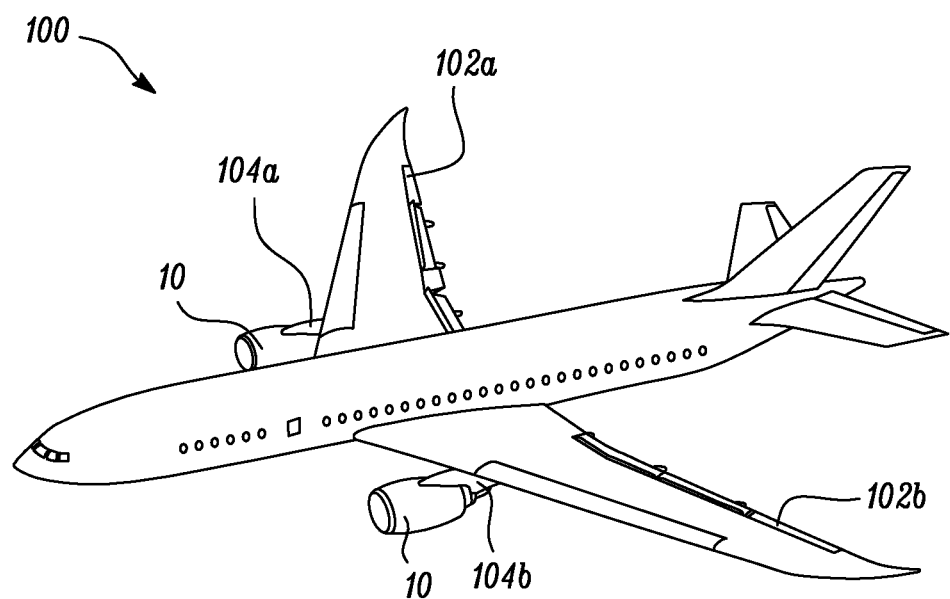
FIG. 8 shows an aircraft having two gas turbine engines.

FIG. 8 illustrates an example aircraft 100 having a gas turbine engine 10 attached to each wing 102a, 102b thereof. Each gas turbine engine 10 is attached via a respective pylon 104a, 104b. When the aircraft 100 is flying under cruise conditions, as defined herein, each gas turbine engine 10 operates according to the parameters defined herein. For example, the gas turbine engines 10 operates, at cruise conditions, such that any one or more of:

a) the combined pressure ratio defined as:

$$\frac{\text{overall pressure ratio}}{\text{bypass nozzle pressure ratio}}$$

is in a range between 20 and 29, and yet more specifically is in a range between 22 and 27;

b) the jet velocity to OPR ratio defined as:

$$\frac{\text{bypass jet velocity}}{\text{overall pressure ratio}}$$

is in a range between range between 4.7 m/s and 7.7 m/s, and more specifically between 5.0 m/s and 7.0 m/s (i.e. 15.4 ft/s and 25.3 ft/s, and more specifically is in a range between 16.4 ft/s and 23.0 ft/s); and/or c) the temperature-pressure ratio, defined as:

$$\frac{\text{the core temperature rise}}{\text{the bypass nozzle pressure ratio}}$$

is in a range between 1.52 and 1.8, and the overall pressure ratio is in a range between 42.5 and 70, more specifically between 50 and 70, and yet more specifically between 52 and 65.

Figure 9:
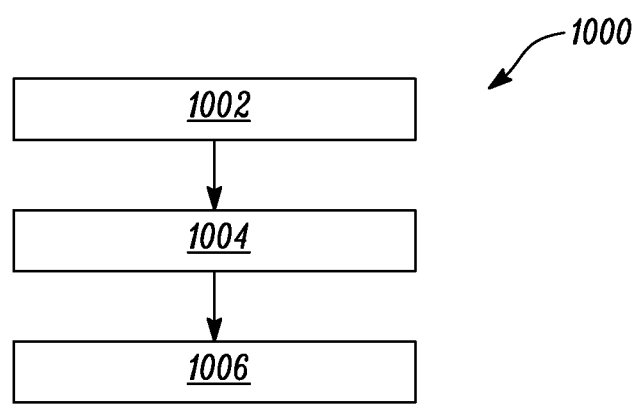
FIG. 9 illustrates a method of operating a gas turbine engine.

The present disclosure also relates to a method 1000 of operating a gas turbine engine on an aircraft. The method 1000 is illustrated in FIG. 9. The method 1000 comprises operating the gas turbine engine 10 described elsewhere herein to provide propulsion under cruise conditions. The method 1000 comprises starting up 1002 the engine 10 (e.g. prior to taxiing on a runway), and operating 1004 the engine during taxiing, take-off, and climb of the aircraft 50, as suitable, so as to reach cruise conditions. Once cruise conditions have been reached, the method 1000 then comprises operating 1006 the gas turbine engine 10 described in embodiments elsewhere herein to provide propulsion under cruise conditions.

The gas turbine engine is operated such that any of the parameters or ratios defined or claimed herein are within the specified ranges. For example, the method 1000 comprises operating 1002 the gas turbine engine 10 at cruise conditions such that any one or more of:

a) the combined pressure ratio defined as:

$$\frac{\text{overall pressure ratio}}{\text{bypass nozzle pressure ratio}}$$

is in a range between 20 and 29; and more specifically is in a range between 22 and 27;

b) the jet velocity ratio defined as:

$$\frac{\text{bypass jet velocity}}{\text{overall pressure ratio}}$$

is in a range between range between 4.7 m/s and 7.7 m/s, and more specifically between 5.0 m/s and 7.0 m/s (i.e. 15.4 ft/s and 25.3 ft/s, and more specifically is in a range between 16.4 ft/s and 23.0 ft/s); and/or c) the temperature-pressure ratio, defined as:

$$\frac{\text{the core temperature rise}}{\text{the bypass nozzle pressure ratio}}$$

is in a range between 1.52 and 1.8, and the overall pressure ratio is in a range between 42.5 and 70, more specifically between 50 and 70, and yet more specifically between 52 and 65.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine for an aircraft comprising:
an engine core comprising a turbine system comprising one or more turbines, a compressor system comprising one or more compressors, and a core shaft connecting the turbine system to the compressor system, wherein a compressor exit pressure is defined as an average pressure of airflow at the exit of the highest pressure compressor of the compressor system at cruise conditions, the engine core further comprising an annular splitter at which flow is divided between a core flow that flows through the engine core, and a bypass flow that flows along a bypass duct, wherein stagnation streamlines around the circumference of the engine, stagnating on a leading edge of the annular splitter, form a streamsurface forming a radially outer boundary of a streamtube that contains all of the core flow;
a fan located upstream of the engine core, the fan comprising a plurality of fan blades extending from a hub, each fan blade having a leading edge and a trailing edge, each fan blade having a radially inner portion lying within the streamtube that contains the core flow, and wherein a fan root entry pressure is defined as an average pressure of airflow across the leading edge of the radially inner portion of each fan blade at cruise conditions; and
a nacelle surrounding the engine core, the nacelle defining the bypass duct and a bypass exhaust nozzle, wherein:
a compression stage number is defined as a number of compression stages provided by the fan and the compressor system combined, and wherein the compression stage number is 13 or 14;
an overall pressure ratio, OPR, is defined as the compressor exit pressure divided by the fan root entry pressure,
a bypass jet velocity (vjet) is defined as the jet velocity of air flow exiting the bypass exhaust nozzle at cruise conditions, and
a jet velocity to OPR ratio defined as:

$$\frac{\text{bypass jet velocity}}{\text{overall pressure ratio}}$$

is in a range between 4.7 m/s and 7.7 m/s; and
an annular fan face is defined at a leading edge of the fan, and
a quasi-non-dimensional mass flow rate Q is defined as:

$$Q = W \frac{\sqrt{T_0}}{P_0 \cdot A_{fan}}$$

where:
W is mass flow rate through the fan in Kg/s;
$T_0$ is average stagnation temperature of the air at the fan face in Kelvin;
$P_0$ is average stagnation pressure of the air at the fan face in Pa;
$A_{fan}$ is an area of the fan face in m²;
wherein at cruise conditions, Q has a value in the range between
0.031 Kgs⁻¹N⁻¹K^{1/2} and 0.036 Kgs⁻¹N⁻¹K^{1/2}.

2. A gas turbine engine according to claim 1, wherein the jet velocity to OPR ratio is in a range between 5.0 m/s and 7.0 m/s.

3. A gas turbine engine according to claim 1, wherein the overall pressure ratio is
in a range between 42.5 and 70.

4. A gas turbine engine according to claim 1, wherein the jet velocity to OPR ratio is in a range between 5.0 m/s and 7.0 m/s and: the overall pressure ratio is in a range between 50 and 70.

5. A gas turbine engine according to claim 1, wherein the bypass jet velocity is in a range between 300 m/s and 366 m/s.

6. A gas turbine engine according to claim 1, wherein:
the compressor system comprises a first compressor and a second compressor,
the turbine system comprises a first turbine and a second turbine, the core shaft is a first core shaft connecting the first compressor and the first turbine, the engine core further comprises a second core shaft connecting the second turbine to the second compressor, the second turbine, second compressor, and second core shaft are arranged to rotate at a higher rotational speed than the first core shaft, wherein the first compressor comprises 3 compression stages and the second compressor comprises 10 compression stages or greater.

7. A gas turbine engine according to claim 1, wherein a stage pressure rise is generated across each compression stage of the compressor system, and the average stage pressure rise of the compressor stages provided in the compressor system is in the range between 1.3 and 1.4.

8. A gas turbine engine according to claim 1, wherein, at cruise conditions, the specific thrust of the gas turbine engine is
in a range between 70 $Nkg^{-1}s$ and 90 $Nkg^{-1}s$.

9. The gas turbine engine according to claim 1, wherein a fan tip loading at cruise conditions is defined as $dH/Utip^2$, where dH is the enthalpy rise across the fan and Utip is the translational velocity of the fan blades at the tip of the leading edge of the fan, and wherein the fan tip loading is in a range from 0.28 to 0.34.

10. The gas turbine engine according to claim 9, wherein the fan tip loading takes a value in the range from 0.29 to 0.31 at cruise conditions.

11. The gas turbine engine according to claim 1, wherein a fan tip pressure ratio is defined as the ratio of the mean total pressure of the air flow at the exit of the fan that subsequently flows through the bypass duct to the mean total pressure of the air flow at the inlet of the fan, and wherein, at cruise conditions
the fan tip pressure ratio is in a range between 1.2 and 1.45.

12. The gas turbine engine according to claim 1, wherein a fan root pressure ratio is defined as the ratio of the mean total pressure of the air flow at the exit of the fan that subsequently flows through the engine core to the mean total pressure of the air flow at the inlet of the fan, and wherein, at cruise conditions
the fan root pressure ratio is in a range between 1.13 and 1.3.

13. The gas turbine engine according to claim 1, wherein a fan pressure ratio is defined as the ratio of the mean total pressure of the air flow at the exit of the fan to the mean total pressure of the air flow at the inlet of the fan, and wherein, at cruise conditions
the fan pressure ratio is in a range between 1.35 and 1.43.

14. The gas turbine engine according to claim 1, wherein cruise conditions means the conditions at mid-cruise of an aircraft to which the engine is attached.

15. The gas turbine engine according to claim 1, wherein any one or more of:
a) the forward speed of the gas turbine engine at the cruise conditions is in the range of from Mn 0.75 to Mn 0.85;
b) the cruise conditions correspond to atmospheric conditions defined by the International Standard Atmosphere at an altitude of 11582 m and a forward Mach Number of 0.8;
c) the cruise conditions correspond to atmospheric conditions defined by the International Standard Atmosphere at an altitude of 10668 m and a forward Mach Number of 0.85; and/or
d) the cruise conditions correspond to atmospheric conditions at an altitude that is in a range of from 10500 m to 11600 m.

16. The gas turbine engine according to claim 1, further comprising a gearbox that receives an input from the core shaft and outputs drive to the fan so as to drive the fan at a lower rotational speed than the core shaft; and wherein the gearbox has a gear ratio in a range from 3 and 4.

17. A method of operating a gas turbine engine on an aircraft, the gas turbine engine being defined as in claim 1, wherein the method comprises:
operating the gas turbine engine to provide propulsion under cruise conditions such that the jet velocity ratio is in a range between 4.7 m/s and 7.7 m/s.

* * * * *